United States Patent [19]

Sachs

[11] Patent Number: 5,794,003
[45] Date of Patent: Aug. 11, 1998

[54] INSTRUCTION CACHE ASSOCIATIVE CROSSBAR SWITCH SYSTEM

[75] Inventor: Howard G. Sachs, Belvedere, Calif.

[73] Assignee: Intergraph Corporation, Huntsville, Ala.

[21] Appl. No.: 754,337

[22] Filed: Nov. 22, 1996

Related U.S. Application Data

[63] Continuation of Ser. No. 498,135, Jul. 5, 1995, abandoned, which is a continuation of Ser. No. 147,797, Nov. 5, 1993, abandoned.

[51] Int. Cl.$^6$ .................................................. G06F 9/30
[52] U.S. Cl. ............................ 395/391; 395/379; 395/800
[58] Field of Search .................................. 395/709, 390, 395/391, 392, 379, 312, 800

[56] References Cited

U.S. PATENT DOCUMENTS

| | | | |
|---|---|---|---|
| 4,437,149 | 3/1984 | Pomerene et al. | 395/389 |
| 4,847,755 | 7/1989 | Morrison et al. | 395/379 |
| 4,933,837 | 6/1990 | Freidin | 395/452 |
| 5,055,997 | 10/1991 | Sluijter et al. | 395/312 |
| 5,081,575 | 1/1992 | Hiller et al. | 395/312 |
| 5,101,341 | 3/1992 | Circello et al. | 395/389 |
| 5,121,502 | 6/1992 | Rau et al. | 395/800 |
| 5,129,067 | 7/1992 | Johnson | 395/389 |
| 5,151,981 | 9/1992 | Westcott et al. | 395/185.03 |
| 5,179,680 | 1/1993 | Colwell et al. | 395/452 |
| 5,197,137 | 3/1993 | Kumar et al. | 395/677 |
| 5,203,002 | 4/1993 | Wetzel | 395/800 |
| 5,214,763 | 5/1993 | Blaner et al. | 395/388 |
| 5,226,169 | 7/1993 | Gregor | 395/800 |
| 5,233,696 | 8/1993 | Suzuki | 395/380 |
| 5,239,654 | 8/1993 | Ing-Simmons | 395/800 |
| 5,297,255 | 3/1994 | Hamanaka et al. | 395/800 |
| 5,297,281 | 3/1994 | Emma et al. | 395/392 |
| 5,299,321 | 3/1994 | Iizuka | 395/388 |
| 5,367,694 | 11/1994 | Ueno | 395/800 |
| 5,442,760 | 8/1995 | Rustad et al. | 395/391 |

FOREIGN PATENT DOCUMENTS

| | | |
|---|---|---|
| 0 449 661 A2 | 10/1991 | European Pat. Off. |
| 0499 661 A2 | 10/1991 | European Pat. Off. |
| 0 496 928 A2 | 8/1992 | European Pat. Off. |

OTHER PUBLICATIONS

Minagawa et al., "Pre–decoding mechanism for superscalar architecture", IEEE Pacific Rim Conference on Communications, Computers, and Signal Processing, pp. 21–24, May 9, 1991.

DeGloria et al., "A programmable instruction format extension to VLIW architecture", Computer Systems and Software Engineering 6th Annual European Computer Conference, pp. 36–37, May 4, 1992.

Agerwala et al., "High performance reduced instruction set processors," RC 12434 (#55845), Computer Science, Jan. 9, 1987.

Bakoglu et al., "The IBM RISC system/6000 processor: hardware overview," IBM J. Res. Develop., 34(1):12–22 (Jan., 1990).

(List continued on next page.)

Primary Examiner—Parshotam S. Lall
Assistant Examiner—Viet Vu
Attorney, Agent, or Firm—Townsend and Townsend and Crew LLP

[57] ABSTRACT

A computing system as described in which individual instructions are executable in parallel by processing pipelines, and instructions to be executed in parallel by different pipelines are supplied to the pipelines simultaneously. The system includes storage for storing an arbitrary number of the instructions to be executed. The instructions to be executed are tagged with pipeline identification tags indicative of the pipeline to which they should be dispatched. The pipeline identification tags are supplied to a system which controls a crossbar switch, enabling the tags to be used to control the switch and supply the appropriate instructions simultaneously to the differing pipelines.

33 Claims, 5 Drawing Sheets

OTHER PUBLICATIONS

De Gloria et al., "A programmable instruction format extension to VLIW architectures," *Proceedings Comp. Euro. 1992*, pp. 35–40 (May 4, 1992).

Fisher et al., "Parallel processing: a smart compiler and a dumb machine," *SIGPLAN Notices*, 19(6):37–47 (Jun., 1984).

Hennessy et al., *Computer Architecture; A Quantitative Approach*, ISBN 1-55880-069-8, Morgan Kaufmann Publishers, Inc. (1990).

Brian Case, et al., "DEC Enters Microprocessor Business with Alpha," *Microprocessor Report* (Mar. 4, 1992) 6(3):1, 6–14.

Todd A. Dutton, "The Design of the DEC 3000 Model 500 AXP Workstation," *IEEE* (1993) 1063–6390/93, pp. 449–455.

Brian Allison, "DEC 7000/10000 Model 600 AXP Multiprocessor Server," *IEEE* (1993) 1063–6390/93, pp. 456–464.

R. B. Grove, et al., "GEM Optimizing Compilers for Alpha AXP Systems," *IEEE* (1993) 1063–6390/93, pp. 465–473.

Johnson, "Superscalar Microprocessor Design", Prentice-Hall 1991 pp. 233–235.

Minagawa et al, "Pre–Decoding Mechanism for Superscalar Architecture", IEEE Computers & Signal Processing, Dec. 1991, pp. 21–24.

INSTRUCTION CACHE ASSOCIATIVE CROSSBAR SWITCH SYSTEM

This is a Continuation of application No. 08/498,135, filed Jul. 5, 1995, now abandoned; which is a continuation of Ser. No. 08/147,797 filed Nov. 5, 1993, now abandoned, the disclosure of which is incorporated by reference.

BACKGROUND OF THE INVENTION

This invention relates to the architecture of computing systems, and in particular to an architecture in which individual instructions may be executed in parallel, as well as to methods and apparatus for accomplishing that.

A common goal in the design of computer architectures is to increase the speed of execution of a given set of instructions. One approach to increasing instruction execution rates is to issue more than one instruction per clock cycle, in other words, to issue instructions in parallel. This allows the instruction execution rate to exceed the clock rate. Computing systems that issue multiple independent instructions during each clock cycle must solve the problem of routing the individual instructions that are dispatched in parallel to their respective execution units. One mechanism used to achieve this parallel routing of instructions is generally called a "crossbar switch."

In present state of the art computers, e.g. the Digital Equipment Alpha, the Sun Microsystems SuperSparc, and the Intel Pentium, the crossbar switch is implemented as part of the instruction pipeline. In these machines the crossbar is placed between the instruction decode and instruction execute stages. This is because the conventional approach requires the instructions to be decoded before it is possible to determine the pipeline to which they should be dispatched. Unfortunately, decoding in this manner slows system speed and requires extra surface area on the integrated circuit upon which the processor is formed. These disadvantages are explained further below.

SUMMARY OF THE INVENTION

We have developed a computing system architecture that enables instructions to be routed to an appropriate pipeline more quickly, at lower power, and with simpler circuitry than previously possible. This invention places the crossbar switch earlier in the pipeline, making it a part of the initial instruction fetch operation. This allows the crossbar to be a part of the cache itself, rather than a stage in the instruction pipeline. It also allows the crossbar to take advantage of circuit design parameters that are typical of regular memory structures rather than random logic. Such advantages include: lower switching voltages (200–300 milliamps rather than 3–5 volts); more compact design, and higher switching speeds. In addition, if the crossbar is placed in the cache, the need for many sense amplifiers is eliminated, reducing the circuitry required in the system as a whole.

To implement the crossbar switch, the instructions coming from the cache, or otherwise arriving at the switch, must be tagged or otherwise associated with a pipeline identifier to direct the instructions to the appropriate pipeline for execution. In other words, pipeline dispatch information must be available at the crossbar switch at instruction fetch time, before conventional instruction decode has occurred. There are several ways this capability can be satisfied: In one embodiment this system includes a mechanism that routes each instruction in a set of instructions to be executed in parallel to an appropriate pipeline, as determined by a pipeline tag applied to each instruction during compilation, or placed in a separate identifying instruction that accompanies the original instruction. Alternately the pipeline affiliation can be determined after compilation at the time that instructions are fetched from memory into the cache, using a special predecoder unit.

Thus, in one implementation, this system includes a register or other means, for example, the memory cells providing for storage of a line in the cache, for holding instructions to be executed in parallel. Each instruction has associated with it a pipeline identifier indicative of the pipeline to which that instruction is to be issued. A crossbar switch is provided which has a first set of connectors coupled to receive the instructions, and a second set of connectors coupled to the processing pipelines to which the instructions are to be dispatched for execution. Means are provided which are responsive to the pipeline identifiers of the individual instructions in the group supplied to the first set of connectors for routing those individual instructions onto appropriate paths of the second set of connectors, thereby supplying each instruction in the group to be executed in parallel to the appropriate pipeline.

In a preferred embodiment of this invention the associative crossbar is implemented in the instruction cache. By placing the crossbar in the cache all switching is done at low signal levels (approximately 200–300 millivolts). Switching at these low levels is substantially faster than switching at higher levels (5 volts) after the sense amplifiers. The lower power also eliminates the need for large driver circuits, and eliminates numerous sense amplifiers. Additionally by implementing the crossbar in the cache, the layout pitch of the crossbar lines matches the pitch of the layout of the cache.

DESCRIPTION OF THE SPECIFIC EMBODIMENTS

Figure 1:
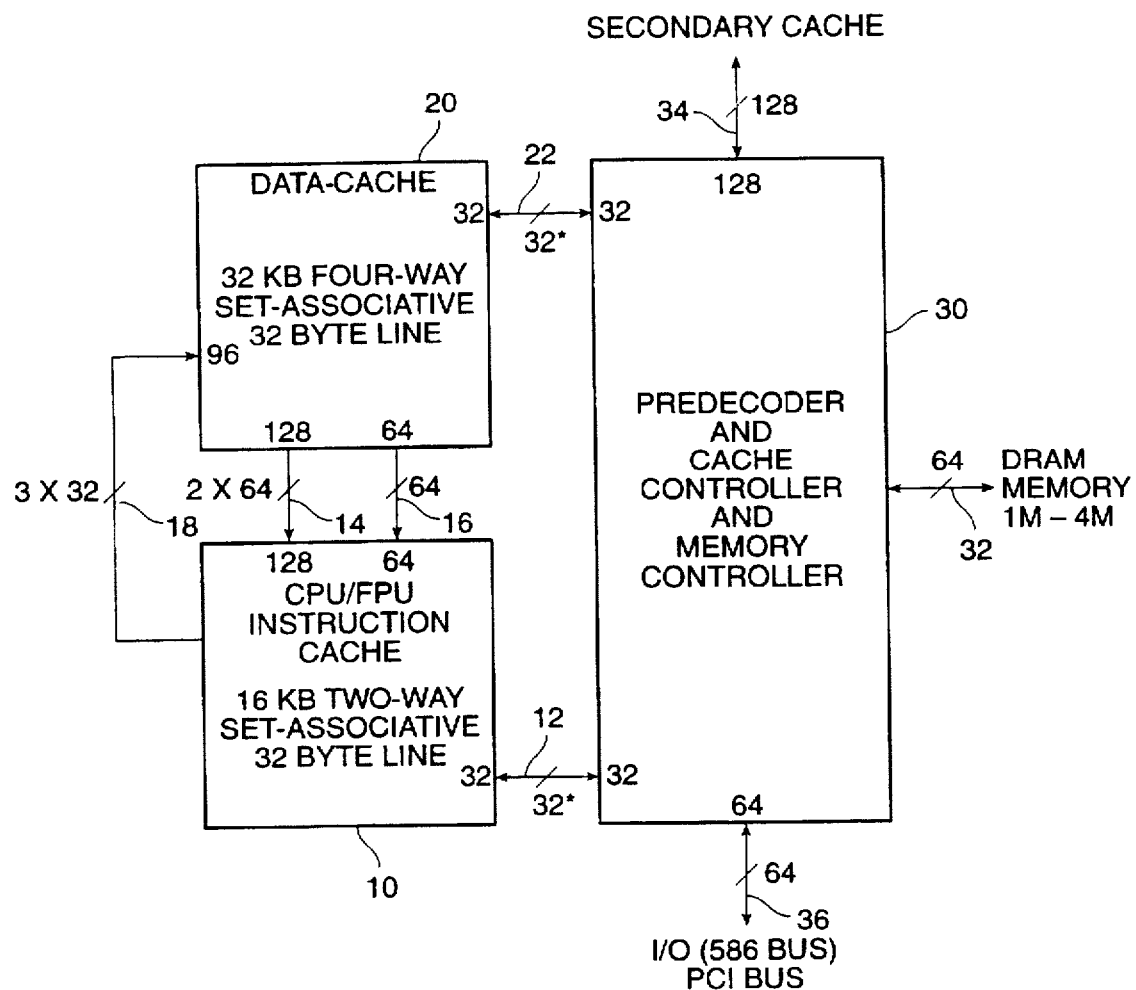
FIG. 1 is a block diagram illustrating a typical environment for a preferred implementation of this invention.

FIG. 1 is a block diagram of a computer system incorporating the associative crossbar switch according to the preferred embodiment of this invention. The following briefly describes the overall preferred system environment within which the crossbar is incorporated. For additional information about the system, see copending U.S. Patent application Ser. No. 08/147,800, filed Nov. 5, 1995, and entitled "Software Scheduled Superscaler Computer Architecture," which is incorporated by reference herein. FIG. 1 illustrates the organization of the integrated circuit chips by which the computing system is formed. As depicted, the system includes a first integrated circuit 10 that includes a central processing unit, a floating point unit, and an instruction cache.

In the preferred embodiment the instruction cache is a 16 kilobyte two-way set-associative 32 byte line cache. A set associative cache is one in which the lines (or blocks) can be placed only in a restricted set of locations. The line is first mapped into a set, but can be placed anywhere within that set. In a two-way set associative cache, two sets, or compartments, are provided, and each line can be placed in one compartment or the other.

The system also includes a data cache chip 20 that comprises a 32 kilobyte four-way set-associative 32 byte line cache. The third chip 30 of the system includes a predecoder, a cache controller, and a memory controller. The predecoder and instruction cache are explained further below. For the purposes of this invention, the CPU, FPU, data cache, cache controller and memory controller all may be considered of conventional design.

The communication paths among the chips are illustrated by arrows in FIG. 1. As shown, the CPU/FPU and instruction cache chip communicates over a 32 bit wide bus 12 with the predecoder chip 30. The asterisk is used to indicate that these communications are multiplexed so that a 64 bit word is communicated in two cycles. Chip 10 also receives information over 64 bit wide buses 14, 16 from the data cache 20, and supplies information to the data cache 20 over three 32 bit wide buses 18. The predecoder decodes a 32 bit instruction received from the secondary cache into a 64 bit word, and supplies that 64 bit word to the instruction cache on chip 10.

The cache controller on chip 30 is activated whenever a first level cache miss occurs. Then the cache controller either goes to main memory or to the secondary cache to fetch the needed information. In the preferred embodiment the secondary cache lines are 32 bytes and the cache has an 8 kilobyte page size.

The data cache chip 20 communicates with the cache controller chip 30 over another 32 bit wide bus. In addition, the cache controller chip 30 communicates over a 64 bit wide bus 32 with the DRAM memory, over a 128 bit wide bus 34 with a secondary cache, and over a 64 bit wide bus 36 to input/output devices.

As will be described further below, the system shown in FIG. 1 includes multiple pipelines able to operate in parallel on separate instructions which are dispatched to these parallel pipelines simultaneously. In one embodiment the parallel instructions have been identified by the compiler and tagged with a pipeline identification tag indicative of the specific pipeline to which that instruction should be dispatched.

In this system, an arbitrary number of instructions can be executed in parallel. In one embodiment of this system the central processing unit includes eight functional units and is capable of executing eight instructions in parallel. These pipelines are designated using the digits 0 to 7. Also, for this explanation each instruction word is assumed to be 32 bits (4 bytes) long.

As briefly mentioned above, in the preferred embodiment the pipeline identifiers are associated with individual instructions in a set of instructions during compilation. In the preferred embodiment, this is achieved by compiling the instructions to be executed using a well-known compiler technology. During the compilation, the instructions are checked for data dependencies, dependence upon previous branch instructions, or other conditions that preclude their execution in parallel with other instructions. The result of the compilation is identification of a set or group of instructions which can be executed in parallel. In addition, in the preferred embodiment, the compiler determines the appropriate pipeline for execution of an individual instruction. This determination is essentially a determination of the type of instruction provided. For example, load instructions will be sent to the load pipeline, store instructions to the store pipeline, etc. The association of the instruction with the given pipeline can be achieved either by the compiler, or by later examination of the instruction itself, for example, during predecoding.

Referring again to FIG. 1, in normal operation the CPU will execute instructions from the instruction cache according to well-known principles. On an instruction cache miss, however, a set of instructions containing the instruction missed is transferred from the main memory into the secondary cache and then into the primary instruction cache, or from the secondary cache to the primary instruction cache, where it occupies one line of the instruction cache memory. Because instructions are only executed out of the instruction cache, all instructions ultimately undergo the following procedure.

At the time a group of instructions is transferred into the instruction cache, the instruction words are predecoded by the predecoder 30. As part of the predecoding process, a multiple bit field prefix is added to each instruction based upon a tag added to the instruction by the compiler. This prefix gives the explicit pipe number of the pipeline to which that instruction will be routed. Thus, at the time an instruction is supplied from the predecoder to the instruction cache, each instruction will have a pipeline identifier.

It may be desirable to implement the system of this invention on computer systems that already are in existence and therefore have instruction structures that have already been defined without available blank fields for the pipeline information. In this case, in another embodiment of this invention, the pipeline identifier information is supplied on a different clock cycle, then combined with the instructions in the cache or placed in a separate smaller cache. Such an approach can be achieved by adding a "no-op" instruction with fields that identify the pipeline for execution of the instruction, or by supplying the information relating to the parallel instructions in another manner. It therefore should be appreciated that the manner in which the instruction and pipeline identifier arrives at the crossbar to be processed is somewhat arbitrary. I use the word "associated" herein to designate the concept that the pipeline identifiers are not required to have a fixed relationship to the instruction words. That is, the pipeline identifiers need not be embedded within the instructions themselves by the compiler. Instead they may arrive from another means, or on a different cycle.

Figure 2:
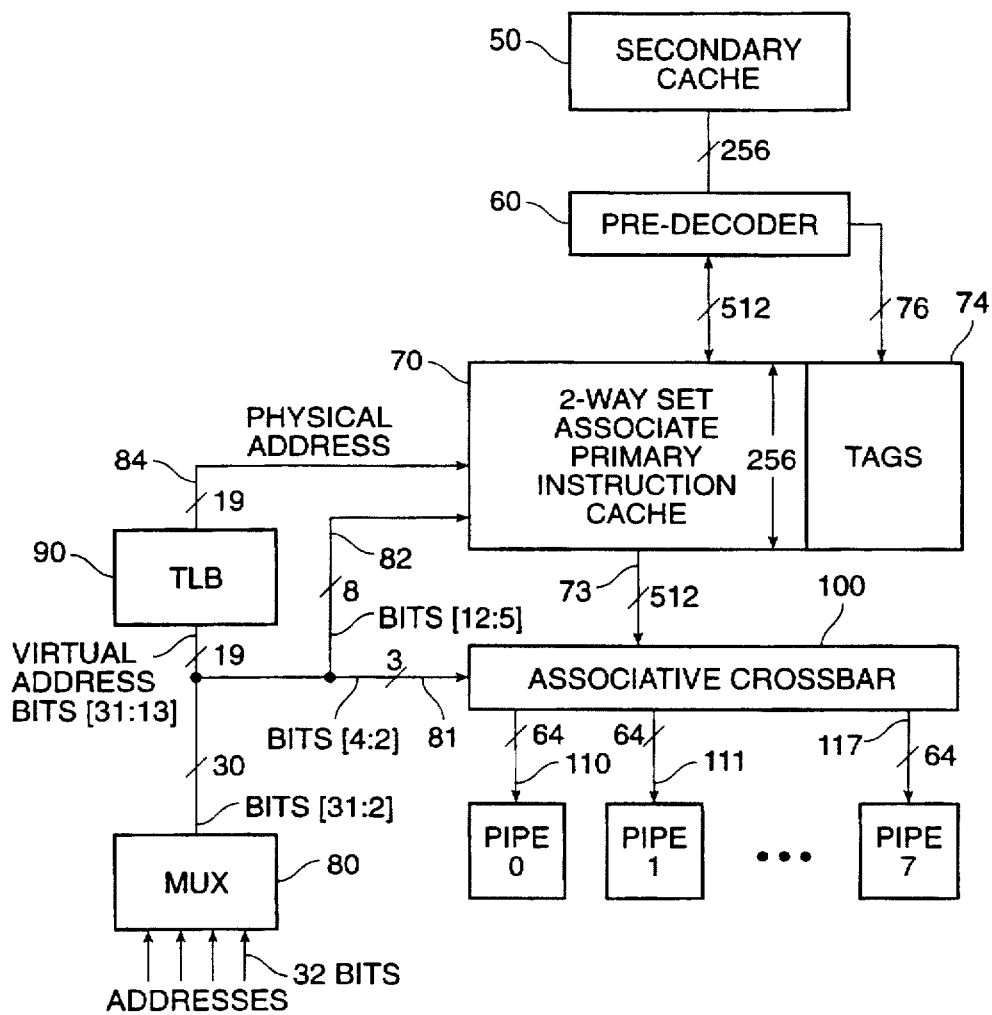
FIG. 2 is a diagram illustrating the overall structure of the instruction cache of FIG. 1.
Figure 3:
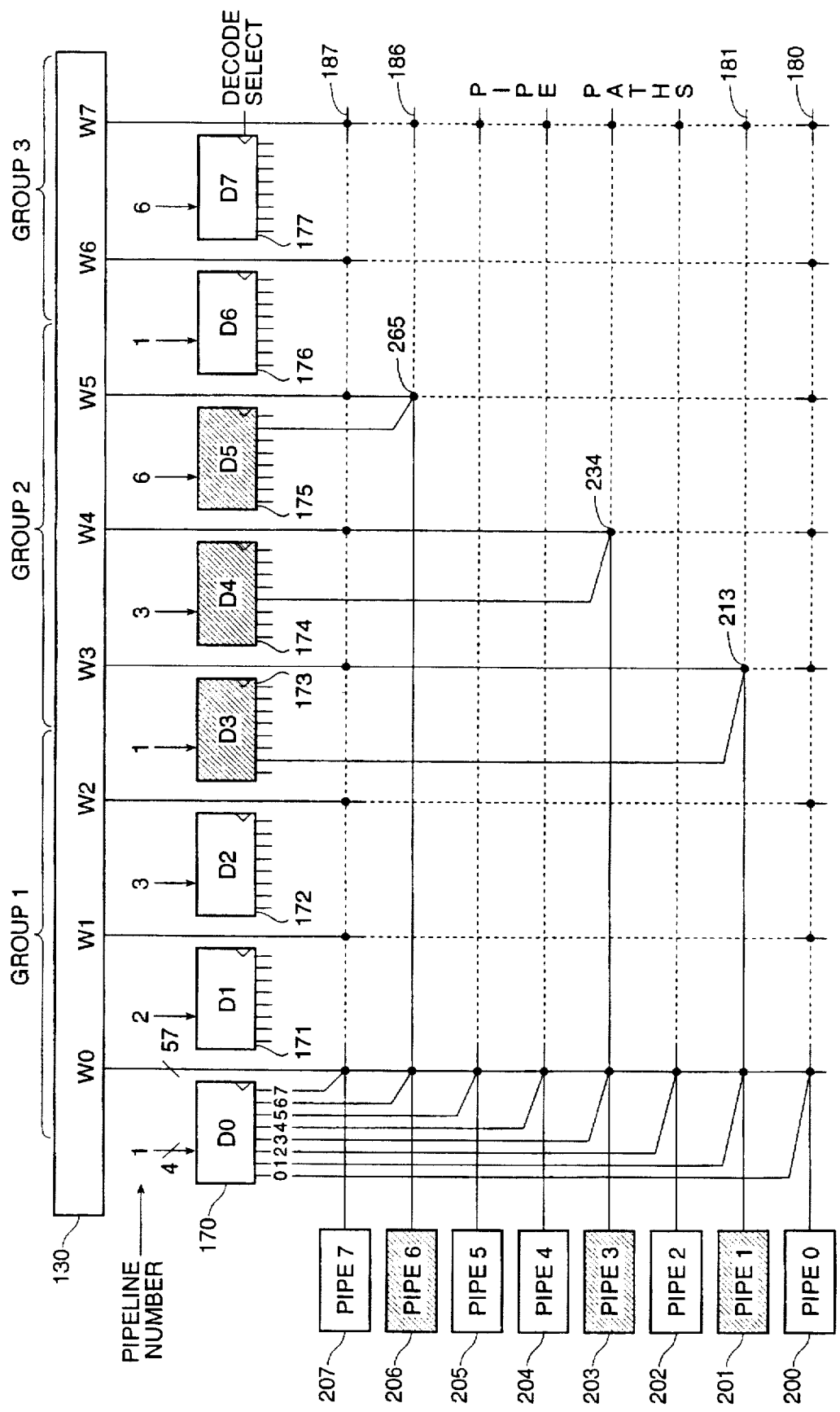
FIG. 3 is a diagram illustrating one embodiment of the associative crossbar.
Figure 4:
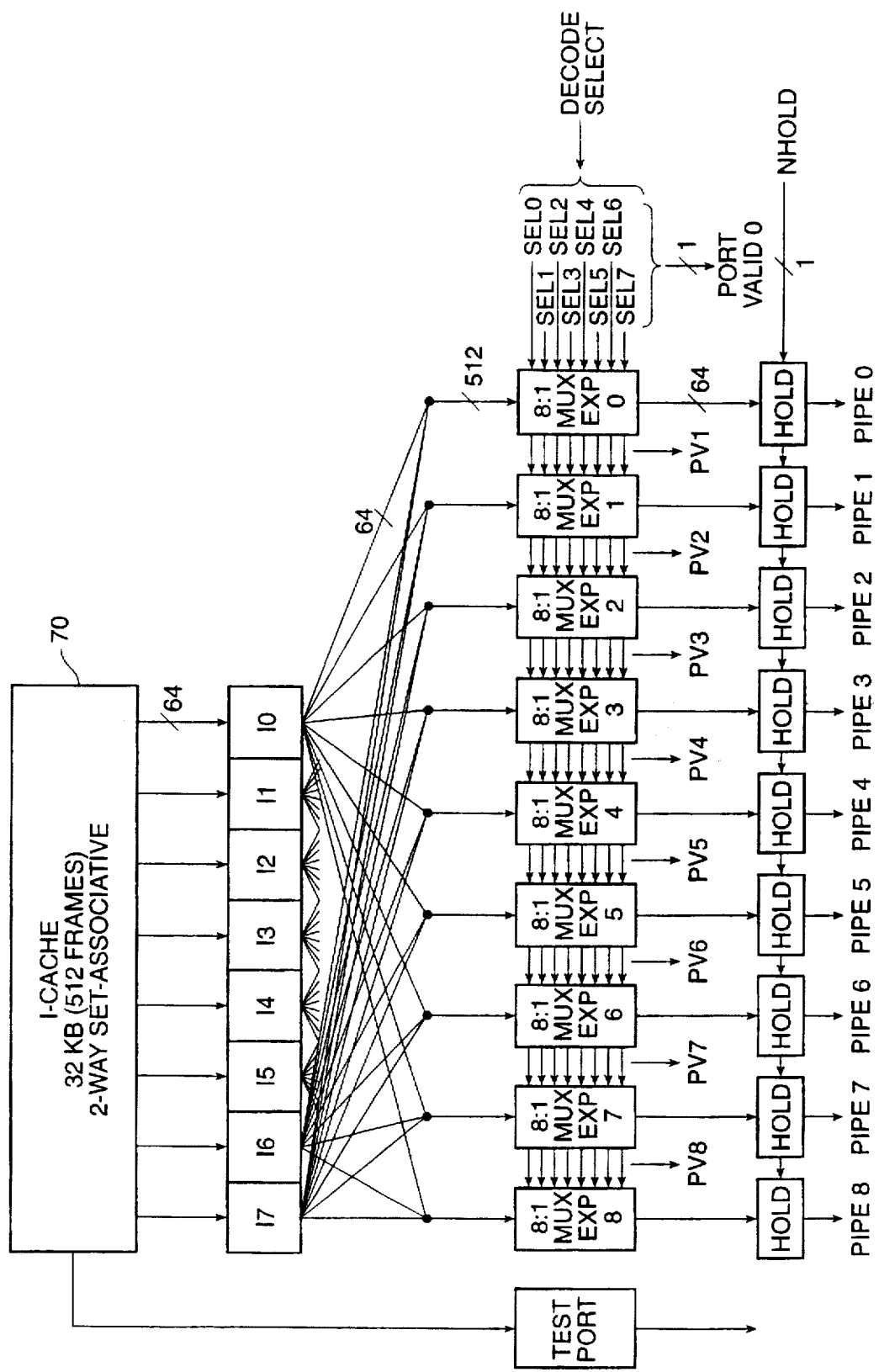
FIG. 4 is a diagram illustrating another embodiment of the associative crossbar.
Figure 5:
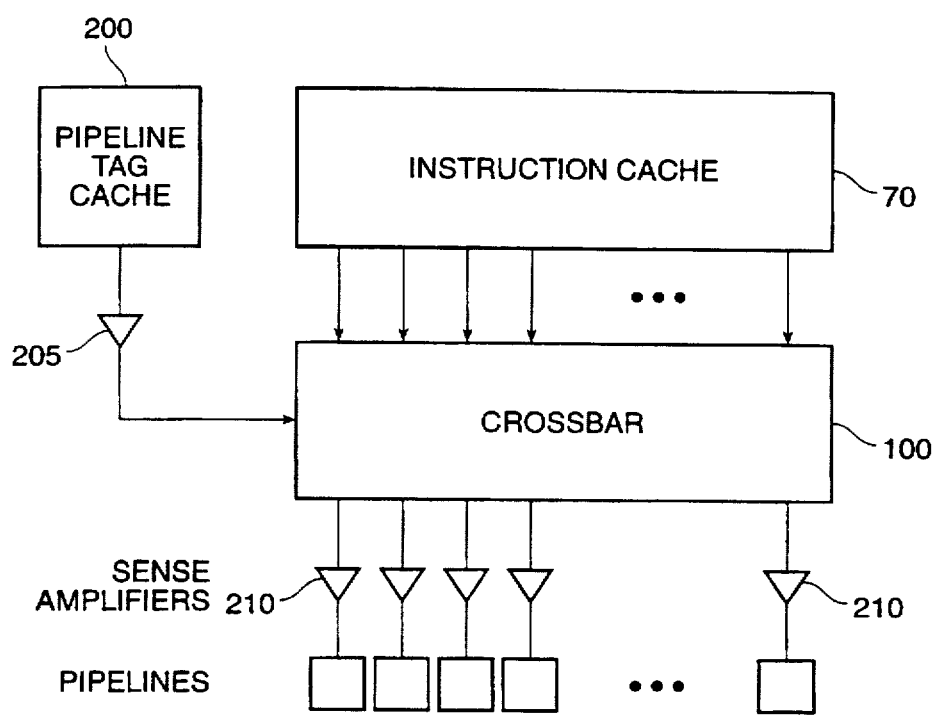
FIG. 5 is a diagram illustrating another embodiment of the associative crossbar.

FIG. 2 is a simplified diagram illustrating the secondary cache, the predecoder, and the instruction cache. This figure, as well as FIGS. 3, 4 and 5, are used to explain the manner in which the instructions tagged with the pipeline identifier are routed to their designated instruction pipelines.

In FIG. 2, for illustration, assume that groups of instructions to be executed in parallel are fetched in a single transfer across a 256 bit (32 byte) wide path from a secondary cache 50 into the predecoder 60. As explained above, the predecoder prefixes the pipeline "P" field to the instruction. After predecoding the resulting set of instructions is transferred into the primary instruction cache 70. At the same time, a tag is placed into the tag field 74 for that line.

In the preferred embodiment the instruction cache operates as a conventional physically-addressed instruction cache. In the example depicted in FIG. 2, the instruction cache will contain 512 bit sets of instructions of eight instructions each, organized in two compartments of 256 lines.

Address sources for the instruction cache arrive at a multiplexer 80 that selects the next address to be fetched.

Because preferably instructions are always machine words, the low order two address bits <1:0> of the 32 bit address field supplied to multiplexer 80 are discarded. These two bits designate byte and half-word boundaries. Of the remaining 30 bits, the next three low order address bits <4:2>, which designate a particular instruction word in the set, are sent directly via bus 81 to the associative crossbar. The next low eight address bits <12:5> are supplied over bus 82 to the instruction cache 70 where they are used to select one of the 256 lines in the instruction cache. Finally, the remaining 19 bits of the virtual address <31:13> are sent to the translation lookaside buffer (TLB) 90. The TLB translates these bits into the high 19 bits of the physical address. The TLB then supplies them over bus 84 to the instruction cache. In the cache they are compared with the tag of the selected line, to determine if there is a "hit" or a "miss" in the instruction cache.

If there is a hit in the instruction cache, indicating that the addressed instruction is present in the cache, then the selected set of instructions is transferred across the 512 bit wide bus 73 into the associative crossbar 100. The associative crossbar 100 then dispatches the addressed instructions to the appropriate pipelines over buses 110, 111, . . . ., 117. Preferably the bit lines from the memory cells storing the bits of the instruction are themselves coupled to the associative crossbar. This eliminates the need for numerous sense amplifiers, and allows the crossbar to operate on the lower voltage swing information from the cache line directly, without the normally intervening driver circuitry to slow system operation.

FIG. 3 illustrates in more detail one embodiment of the associative crossbar. A 512 bit wide register 130, which represents the memory cells in a line of-the cache (or can be a physically separate register), contains at least the set of instructions capable of being issued. For the purposes of illustration, register 130 is shown as containing up to eight instruction words W0 to W7. Using means described in the copending application referred to above, the instructions have been sorted into groups for parallel execution. For illustration here, assume the instructions in Group 1 are to be dispatched to pipelines 1, 2 and 3; the instructions in Group 2 to pipelines 1, 3 and 6; and the instructions in Group 3 to pipelines 1 and 6. The decoder select signal enables only the appropriate set of instructions to be executed in parallel, essentially allowing register 130 to contain more than just one set of instructions. Of course, by only using register 130 only for one set of parallel instructions at a time, the decoder select signal is not needed.

As shown in FIG. 3, the crossbar switch itself consists of two sets of crossing pathways. In the horizontal direction are the pipeline pathways 180, 181, . . ., 187. In the vertical direction are the instruction word paths, 190, 191, . . ., 197. Each of these pipeline and instruction pathways is themselves a bus for transferring the instruction word. Each horizontal pipeline pathway is coupled to a pipeline execution unit 200, 201, 202, . . ., 207. Each of the vertical instruction word pathways 190, 191, . . ., 197 is coupled to an appropriate portion of register or cache line 130.

The decoders 170, 171, . . ., 177 associated with each instruction word pathway receive the 4 bit pipeline code from the instruction. Each decoder, for example decoder 170, provides eight 1 bit control lines as output. One of these control lines is associated with each pipeline pathway crossing of that instruction word pathway. Selection of a decoder as described with reference to FIG. 3 activates the output bit control line corresponding to that input pipe number. This signals the crossbar to close the switch between the word path associated with that decoder and the pipe path selected by that bit line. Establishing the cross connection between these two pathways causes a selected instruction word to flow into the selected pipeline. For example, decoder 173 has received the pipeline bits for word W3. Word W3 has associated with it pipeline path 1. The pipeline path 1 bits are decoded to activate switch 213 to supply instruction word W3 to pipeline execution unit 201 over pipeline path 181. In a similar manner, the identification of pipeline path 3 for decoder D4 activates switch 234 to supply instruction word W4 to pipeline path 3. Finally, the identification of pipeline 6 for word W5 in decoder D5 activates switch 265 to transfer instruction word W5 to pipeline execution unit 206 over pipeline pathway 186. Thus, instructions W3, W4 and W5 are executed by pipes 201, 203 and 206, respectively.

The pipeline processing units 200, 201, . . ., 207 shown in FIG. 3 can carry out desired operations. In a preferred embodiment of the invention, each of the eight pipelines first includes a sense amplifier to detect the state of the signals on the bit lines from the crossbar. In one embodiment the pipelines include first and second arithmetic logic units; first and second floating point units; first and second load units; a store unit and a control unit. The particular pipeline to which a given instruction word is dispatched will depend upon hardware constraints as well as data dependencies.

FIG. 4 is a diagram illustrating another embodiment of the associative crossbar. In FIG. 4 nine pipelines 0–8 are shown coupled to the crossbar. The decode select is used to enable a subset of the instructions in the register 130 for execution just as in the system of FIG. 3.

The execution ports that connect to the pipelines specified by the pipeline identification bits of the enabled instructions are then selected to multiplex out the appropriate instructions from the contents of the register. If one or more of the pipelines is not ready to receive a new instruction, a set of hold latches at the output of the execution ports prevents any of the enabled instructions from issuing until the "busy" pipeline is free. Otherwise the instructions pass transparently through the hold latches into their respective pipelines. Accompanying the output of each port is a "port valid" signal that indicates whether the port has valid information to issue to the hold latch.

FIG. 5 illustrates an alternate embodiment for the invention where pipeline tags are not included with the instruction, but are supplied separately, or where the cache line itself is used as the register for the crossbar. In these situations, the pipeline tags may be placed into a high speed separate cache memory 200. The output from this memory can then control the crossbar in the same manner as described in conjunction with FIG. 3. This approach eliminates the need for sense amplifiers between the instruction cache and the crossbar. This enables the crossbar to switch very low voltage signals more quickly than higher level signals, and the need for hundreds of sense amplifiers is eliminated. To provide a higher level signal for control of the crossbar, sense amplifier 205 is placed between the pipeline tag cache 200 and the crossbar 100. Because the pipeline tag cache is a relatively small memory, however, it can operate more quickly than the instruction cache memory, and the tags therefore are available in time to control the crossbar despite the sense amplifier between the cache 200 and the crossbar 100. Once the switching occurs in the crossbar, then the signals are amplified by sense amplifiers 210 before being supplied to the various pipelines for execution.

The architecture described above provides many unique advantages to a system using this crossbar. The crossbar described is extremely flexible, enabling instructions to be executed sequentially or in parallel, depending entirely upon the "intelligence" of the compiler. Importantly, the associative crossbar relies upon the content of the message being decoded, not upon an external control circuit acting independently of the instructions being executed. In essence, the associative crossbar is self directed.

Another important advantage of this system is that it allows for more intelligent compilers. Two instructions which appear to a hardware decoder (such as in the prior art described above) to be dependent upon each other can be determined by the compiler not to be interdependent. For example, a hardware decoder would not permit two instructions R1+R2=R3 and R3+R5=R6 to be executed in parallel. A compiler, however, can be "intelligent" enough to determine that the second R3 is a previous value of R3, not the one calculated by R1+R2, and therefore allow both instructions to issue at the same time. This allows the software to be more flexible and faster.

Although the foregoing has been a description of the preferred embodiment of the invention, it will be apparent to those of skill in the art the numerous modifications and variations may be made to the invention without departing from the scope as described herein. For example, arbitrary numbers of pipelines, arbitrary numbers of decoders, and different architectures may be employed, yet rely upon the system we have developed.

I claim:

1. A computing system comprising:

means for forming groups of software-scheduled instructions, software-scheduled instructions within each of the groups executable in parallel; and a super-scaler cache for routing each of the software-scheduled instructions within the groups to be executed in parallel to an appropriate instruction pipeline of a plurality of instruction pipelines, the super-scaler cache comprising:

super-scaler storage for holding one group of the groups of software-scheduled instructions, each software-scheduled instruction within the one group having embedded therein an instruction pipeline identifier of a plurality of instruction pipeline identifiers;

an associative crossbar having a first set of connectors coupled to the super-scaler storage for receiving each of the software-scheduled instructions therefrom, and a second set of connectors coupled to the plurality of instruction pipelines; and means responsive to the instruction pipeline identifier of each of the software-scheduled instructions, for coupling appropriate connectors of the first set of connectors to appropriate connectors of the second set of connectors, to thereby supply each of the software-scheduled instructions to the appropriate instruction pipeline for parallel execution.

2. The computing system of claim 1 wherein:

the first set of connectors comprises a set of first communication buses, one first communication bus for each of the software-scheduled instructions in the super-scaler storage;

the second set of connectors comprises a set of second communication buses, one second communication bus for each of the plurality of instruction pipelines; and the means responsive to the plurality of instruction pipeline identifiers comprising:

a set of selectors coupled to the super-scaler storage to receive as first input signals the instruction pipeline identifier of each of the software-scheduled instructions and in response thereto supply as output signals switch control signals for each of the software-scheduled instructions; and a set of switches, coupled to the set of selectors, one switch located at each intersection of each of the first communication buses with each of the second communication buses, the set of switches providing connections in response to the switch control signals to thereby supply each of the software-scheduled instructions in parallel to the appropriate instruction pipelines.

3. A computing system comprising:

means for assembling sets of software-scheduled instructions to be executed in parallel; and a super-scaler cache for routing each of the software-scheduled instructions in a group to be executed in parallel, to an appropriate instruction pipeline of a plurality of instruction pipelines, the super-scaler cache comprising:

a super-scaler storage for holding the sets of software-scheduled instructions, including at least a set of software-scheduled instructions, and a set of instruction pipeline identifiers, each individual instruction of the first set of software-scheduled instructions having associated therewith an instruction pipeline identifier of the set of instruction pipeline identifiers;

an associative crossbar having a first set of connectors coupled to the super-scaler storage for receiving the set of software-scheduled instructions therefrom and a second set of connectors coupled to the plurality of instruction pipelines;

selection means connected to receive the instruction pipeline identifiers of the set of instruction pipeline identifiers, the selection means for supplying in response thereto output signals; and switching means coupled to receive the output signals for selectively connecting connectors of the first set of connectors to connectors of the second set of connectors to thereby supply each software-scheduled instruction in the set of software-scheduled instructions to be executed in parallel to the appropriate instruction pipeline.

4. The computing system of claim 3 wherein the first set of connectors comprises a set of first communication buses, one of the first communication buses for each of the software-scheduled instructions in the set of software-scheduled instructions in the super-scaler storage;

the second set of connectors comprises a set of second communication buses, one of the second communications buses for each of the plurality of instruction pipelines;

the selection means comprises a set of selectors coupled to receive the instruction pipeline identifiers and in response thereto supply as the output signals a plurality of switch control signals; and the switching means includes a set of switches, one of the switches at each intersection of each of the first set of communication buses with the second set of communication buses, the set of switches providing connections in response to receiving the plurality of switch control signals to thereby supply each of the software-scheduled instructions of the set of software-scheduled instructions to the appropriate instruction pipeline.

5. The computing system of claim 4 wherein each selector in the set of selectors comprise a multiplexer.

6. In a computing system, a method for transferring software-scheduled instructions to be executed through an associative crossbar switch in a super-scaler cache, the associative crossbar switch having a first set of connectors coupled to a super-scaler storage in the super-scaler cache for receiving each of the software-scheduled instructions therefrom and a second set of connectors coupled to a plurality of instruction pipelines, the method comprising the steps of:

forming groups of software-scheduled instructions, software-scheduled instructions within each group executable in parallel;

storing in the super-scaler storage in the super-scaler cache one group of the groups of software-scheduled instructions to be executed in parallel, each software-scheduled instruction in the one group having embedded therein an instruction pipeline identifier of a plurality of instruction pipeline identifiers; and using the instruction pipeline identifier of each of the software-scheduled instructions to control switches in the associative crossbar switch in the super-scaler cache between the first set of connectors and the second set of connectors to thereby supply each of the software-scheduled instructions to an appropriate instruction pipeline.

7. The method of claim 6 wherein the step of using the instruction pipeline identifier comprises:

supplying the instruction pipeline identifiers of each of the software-scheduled instructions in the one group of software-scheduled instructions to a corresponding number of selectors, each of the selectors providing an output signal indicative of the instruction pipeline identifier; and using the output signal of each of the selectors to control the switches between the first set of connectors and the second set of connectors to thereby supply each of the software-scheduled instructions to the appropriate instruction pipeline.

8. An apparatus for routing software-scheduled instruction words to a plurality of instruction pipelines, the apparatus comprising:

means for forming groups of software-scheduled instruction words, software-scheduled instruction words in each group executable in parallel; and a very long instruction word cache for storing a group of software-scheduled instruction words, each of the software-scheduled instruction words in the group having embedded therein a unique instruction pipeline identifier, the very long instruction word cache further comprising:

an associative crossbar having a plurality of connectors coupled to the plurality of instruction pipelines, for selecting which of the plurality of connectors to couple to which of the plurality of instruction pipelines in response to switch selection signals;

a selector for asserting output signals in response to the instruction pipeline identifiers embedded with each of the group of software-scheduled instruction words; and a switch coupled to the associative crossbar, and to the selector, for asserting switch selection signals to the associative crossbar in response to the output signals.

9. An apparatus for routing software-scheduled instruction words to a plurality of instruction pipelines, the apparatus comprising:

means for assembling a group of software-scheduled instruction words, software-scheduled instruction words in the group executable in parallel; and an very long instruction word cache for storing the group of software-scheduled instruction words and a group of instruction pipeline identifiers, the group of instruction pipeline identifiers associated with the group of software-scheduled instruction words, the very long instruction word cache further comprising:

an associative crossbar including a plurality of connectors coupled to the plurality of instruction pipelines, for selecting which of the plurality of connectors to couple to which of the plurality of instruction pipelines in response to switch selection signals;

a selector for asserting output signals in response to the instruction pipeline identifiers associated with each of the group of software-scheduled instruction words; and a switch coupled to the associative crossbar, and to the selector, for asserting switch selection signals to the associative crossbar in response to the output signals.

10. The computing system of claim 2, wherein the instruction pipeline identifier embedded within each software-scheduled instruction is determined by a compiler.

11. The computing system of claim 1, wherein the means for forming the groups of software-scheduled instructions comprises a compiler.

12. The computing system of claim 3, wherein the means for assembling the sets of software-scheduled instructions comprises a compiler.

13. The computing system of claim 4, wherein the instruction pipeline identifiers of the set of instruction pipeline identifiers are determined by a compiler.

14. The method of claim 6, wherein the step of forming groups of software-scheduled instructions comprises using a compiler.

15. The method of claim 7, wherein the instruction pipeline identifiers in the one group of instruction pipeline identifiers are determined by a compiler.

16. The apparatus of claim 8, wherein the means for forming groups of software-scheduled instruction words comprises a compiler.

17. The apparatus of claim 8, wherein the instruction pipeline identifiers of the group of instruction pipeline identifiers are determined by a compiler.

18. The apparatus of claim 9, wherein the software-scheduled instructions of the group of software-scheduled instructions are determined by a compiler.

19. The apparatus of claim 9, wherein the means for assembling a group of software-scheduled instruction words comprises a compiler.

20. In a computing system in which groups of software-scheduled instructions are formed and in which software-scheduled instructions within each of the groups are executable in parallel, a super-scaler cache for routing each of the software-scheduled instructions within the groups to be executed in parallel to an appropriate instruction pipeline of a plurality of instruction pipelines, the super-scaler cache comprising:

super-scaler storage for holding one group of the groups of software-scheduled instructions, each software-scheduled instruction within the one group having embedded therein an instruction pipeline identifier of a plurality of instruction pipeline identifiers;

an associative crossbar having a first set of connectors coupled to the super-scaler storage for receiving each of the software-scheduled instructions therefrom, and a second set of connectors coupled to the plurality of instruction pipelines; and means responsive to the instruction pipeline identifier of each of the software-scheduled instructions, for coupling appropriate connectors of the first set of connectors to appropriate connectors of the second set of connectors, to thereby supply each of the software-scheduled instructions to the appropriate instruction pipeline for parallel execution;

wherein the instruction pipeline identifier embedded within each software-scheduled instruction is determined by a compiler.

21. The super-scaler cache of claim 20 wherein:

the first set of connectors comprises a set of first communication buses, one first communication bus for each of the software-scheduled instructions in the super-scaler storage;

the second set of connectors comprises a set of second communication buses, one second communication bus for each of the plurality of instruction pipelines; and the means responsive to the plurality of instruction pipeline identifiers comprising:

a set of selectors coupled to the super-scaler storage to receive as first input signals the instruction pipeline identifier of each of the software-scheduled instructions and in response thereto supply as output signals switch control signals for each of the software-scheduled instructions; and a set of switches, coupled to the set of selectors, one switch located at each intersection of each of the first communication buses with each of the second communication buses, the set of switches providing connections in response to the switch control signals to thereby supply each of the software-scheduled instructions in parallel to the appropriate instruction pipelines.

22. In a computing system in which sets of software-scheduled instructions are executable in parallel, a super-scaler cache for routing each of the software-scheduled instructions in a group to be executed in parallel, to an appropriate instruction pipeline of a plurality of instruction pipelines, the super-scaler cache comprising:

a super-scaler storage for holding the sets of software-scheduled instructions, including at least a set of software-scheduled instructions, and a set of instruction pipeline identifiers, each individual instruction of the first set of software-scheduled instructions having associated therewith an instruction pipeline identifier of the set of instruction pipeline identifiers;

an associative crossbar having a first set of connectors coupled to the super-scaler storage for receiving the set of software-scheduled instructions therefrom and a second set of connectors coupled to the plurality of instruction pipelines;

selection means connected to receive the instruction pipeline identifiers of the set of instruction pipeline identifiers, the selection means for supplying in response thereto output signals; and switching means coupled to receive the output signals for selectively connecting connectors of the first set of connectors to connectors of the second set of connectors to thereby supply each software-scheduled instruction in the set of software-scheduled instructions to be executed in parallel to the appropriate instruction pipeline;

wherein the instruction pipeline identifiers of the set of instruction pipeline identifiers are determined by a compiler.

23. The super-scalar cache of claim 22 wherein the first set of connectors comprises a set of first communication buses, one of the first communication buses for each of the software-scheduled instructions in the set of software-scheduled instructions in the super-scaler storage;

the second set of connectors comprises a set of second communication buses, one of the second communications buses for each of the plurality of instruction pipelines;

the selection means comprises a set of selectors coupled to receive the instruction pipeline identifiers and in response thereto supply as the output signals a plurality of switch control signals; and the switching means includes a set of switches, one of the switches at each intersection of each of the first set of communication buses with the second set of communication buses, the set of switches providing connections in response to receiving the plurality of switch control signals to thereby supply each of the software-scheduled instructions of the set of software-scheduled instructions to the appropriate instruction pipeline.

24. The super-scalar cache of claim 23 wherein each selector in the set of selectors comprise a multiplexer.

25. In a computing system in which groups of software-scheduled instructions are executable in parallel, a method for transferring each software-scheduled instruction in a group to be executed through an associative crossbar switch in a super-scaler cache, the associative crossbar switch having a first set of connectors coupled to a super-scaler storage in the super-scaler cache for receiving each of the software-scheduled instructions therefrom and a second set of connectors coupled to a plurality of instruction pipelines, the method comprising:

storing in the super-scaler storage in the super-scaler cache one group of the groups of software-scheduled instructions to be executed in parallel, each software-scheduled instruction in the one group having embedded therein an instruction pipeline identifier of a plurality of instruction pipeline identifiers; and using the instruction pipeline identifier of each of the software-scheduled instructions to control switches in the associative crossbar switch in the super-scaler cache between the first set of connectors and the second set of connectors to thereby supply each of the software-scheduled instructions to an appropriate instruction pipeline;

wherein the instruction pipeline identifiers in the one group of instruction pipeline identifiers are determined by a compiler.

26. The method of claim 25 wherein the step of using the instruction pipeline identifier comprises:

supplying the instruction pipeline identifiers of each of the software-scheduled instructions in the one group of software-scheduled instructions to a corresponding number of selectors, each of the selectors providing an output signal indicative of the instruction pipeline identifier; and using the output signal of each of the selectors to control the switches between the first set of connectors and the second set of connectors to thereby supply each of the software-scheduled instructions to the appropriate instruction pipeline.

27. In a computing system in which groups of software-scheduled instructions are executed in parallel by parallel processors, an apparatus for routing groups of software-scheduled instruction words to a plurality of instruction pipelines, the apparatus comprising:

a very long instruction word cache for storing a group of software-scheduled instruction words, each of the software-scheduled instruction words in the group having embedded therein a unique instruction pipeline identifier, the very long instruction word cache further comprising:

an associative crossbar having a plurality of connectors coupled to the plurality of instruction pipelines, for selecting which of the plurality of connectors to couple to which of the plurality of instruction pipelines in response to switch selection signals;

a selector for asserting output signals in response to the instruction pipeline identifiers embedded with each of the group of software-scheduled instruction words; and a switch coupled to the associative crossbar, and to the selector, for asserting switch selection signals to the associative crossbar in response to the output signals;

wherein the instruction pipeline identifiers of the group of instruction pipeline identifiers are determined by a compiler.

28. In a computing system in which a group of software-scheduled instructions is executed in parallel by parallel processors, an apparatus for routing the group of software-scheduled instruction words to a plurality of instruction pipelines, the apparatus comprising:

an very long instruction word cache for storing the group of software-scheduled instruction words and a group of instruction pipeline identifiers, the group of instruction pipeline identifiers associated with the group of software-scheduled instruction words, the very long instruction word cache further comprising:

an associative crossbar including a plurality of connectors coupled to the plurality of instruction pipelines, for selecting which of the plurality of connectors to couple to which of the plurality of instruction pipelines in response to switch selection signals;

a selector for asserting output signals in response to the instruction pipeline identifiers associated with each of the group of software-scheduled instruction words; and a switch coupled to the associative crossbar, and to the selector, for asserting switch selection signals to the associative crossbar in response to the output signals;

wherein the instruction pipeline identifiers of the group of instruction pipeline identifiers are determined by a compiler.

29. The super-scaler cache of claim 20, wherein the software-scheduled instructions of the one group are determined by a compiler.

30. The super-scaler cache of claim 22, wherein the software-scheduled instructions of the set of software-scheduled instructions are determined by a compiler.

31. The method of claim 25, wherein the software-scheduled instructions in the one group of software-scheduled instructions are determined by a compiler.

32. The very long instruction word cache of claim 27, wherein the software-scheduled instructions of the group of software-scheduled instructions are determined by a compiler.

33. The apparatus of claim 28, wherein the software-scheduled instructions of the group of software-scheduled instructions are determined by a compiler.

* * * * *

UNITED STATES PATENT AND TRADEMARK OFFICE
CERTIFICATE OF CORRECTION

| | |
|---|---|
| PATENT NO. | : 5,794,003 |
| DATED | : August 11, 1998 |
| INVENTOR(S) | : Howard G. Sachs |

It is certified that error appears in the above-identified patent and that said Letters Patent is hereby corrected as shown below:

Column 2,
Line 56, delete " filed November 5, 1995" and insert -- filed November 5, 1993 --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*